US011332085B2

United States Patent
Shao et al.

(10) Patent No.: US 11,332,085 B2
(45) Date of Patent: May 17, 2022

(54) WIRING STRUCTURE FOR MULTI-SLOT CONNECTION

(71) Applicant: APTIV ELECTRIC SYSTEMS CO., LTD., Shanghai (CN)

(72) Inventors: Yuhui Shao, Shanghai (CN); Ji Han, Shanghai (CN)

(73) Assignee: APTIV ELECTRIC SYSTEMS CO., LTD., Shanghai (CN)

( * ) Notice: Subject to any disclaimer, the term of this patent is extended or adjusted under 35 U.S.C. 154(b) by 18 days.

(21) Appl. No.: 16/958,264

(22) PCT Filed: Dec. 27, 2018

(86) PCT No.: PCT/CN2018/124292
§ 371 (c)(1),
(2) Date: Jun. 26, 2020

(87) PCT Pub. No.: WO2019/129132
PCT Pub. Date: Jul. 4, 2019

(65) Prior Publication Data
US 2020/0339047 A1 Oct. 29, 2020

(30) Foreign Application Priority Data
Dec. 28, 2017 (CN) .......................... 201711458409.8

(51) Int. Cl.
*H02G 3/06* (2006.01)
*B60R 16/02* (2006.01)
*B60R 16/03* (2006.01)

(52) U.S. Cl.
CPC .......... *B60R 16/0222* (2013.01); *B60R 16/03* (2013.01); *H02G 3/0608* (2013.01)

(58) Field of Classification Search
CPC ..... B60R 16/0222; B60R 16/03; B60R 16/02; H02G 3/0608; H02G 3/04; H02G 3/26;
(Continued)

(56) References Cited

U.S. PATENT DOCUMENTS 7,964,796 B2 * 6/2011 Suzuki ................. H02G 3/0437
174/72 C
8,119,913 B2 * 2/2012 Sonotsu .............. B60R 16/0215
174/68.3
(Continued)

FOREIGN PATENT DOCUMENTS

CN 201191734 Y 2/2009
CN 103647239 A 3/2014
(Continued)

*Primary Examiner* — Angel R Estrada
(74) *Attorney, Agent, or Firm* — RMCK Law Group, PLC (57) ABSTRACT

The present disclosure relates to a wiring structure for multi-slot connection, for mounting protective wire harness at the bottom of a vehicle, wherein the wiring structure comprises: a plurality of brackets, the brackets respectively having two ends, and a gap being provided between the ends of two adjacent brackets; at least one wire harness provided inside the bracket and extending through the plurality of brackets; and a flexible sleeve provided at the periphery of the wire harness and overlapped with the gap in the axial direction. Compared with the prior art, the wiring structure of the present disclosure eliminates installation tolerance, is widely applied, and is convenient for transportation, and it is convenient to mount the wire harness.

20 Claims, 6 Drawing Sheets

(58) Field of Classification Search
CPC .......... H02G 3/28; H02G 3/0406; H02G 3/06;
H01B 13/01209; H01B 13/00; H01B
13/004; H01B 7/0045; H01B 7/16
USPC ..... 174/152 G, 681, 68.3, 72 A, 72 C, 74 R,
174/88 R, 70 C, 68.1; 248/68.1, 49
See application file for complete search history.

(56) References Cited

U.S. PATENT DOCUMENTS

| | | | |
|---|---|---|---|
| 8,575,487 B2 * | 11/2013 | Agusa ................. | B60R 16/0215 |
| | | | 174/68.3 |
| 9,376,070 B2 * | 6/2016 | Inao ........................ | H02G 3/32 |
| 9,672,959 B2 * | 6/2017 | Sakaki ..................... | H01B 7/16 |
| 2013/0277106 A1 * | 10/2013 | Toyama ............... | H01B 13/012 |
| | | | 174/72 A |

FOREIGN PATENT DOCUMENTS

| | | |
|---|---|---|
| CN | 108075417 A | 5/2018 |
| JP | 2017034753 A | 2/2017 |

* cited by examiner

WIRING STRUCTURE FOR MULTI-SLOT CONNECTION

CROSS-REFERENCE TO RELATED APPLICATIONS

This application is a 371 U.S. National Stage of International Application No. PCT/CN2018/124292, filed Dec. 27, 2018, which claims priority to Chinese Patent Application No. 201711458409.8, filed Dec. 28, 2017. The disclosures of each of the above applications are incorporated herein by reference in their entirety.

TECHNICAL FIELD

The present invention relates to wiring structures for multiple wiring slots connection in the field of automobile wire harness installation, and in particular relates to flexible wiring structures for multiple wiring slots connection.

BACKGROUND ART

In recent years, with the intensification of the greenhouse effect, various industries have put more and more demands on environmental protection. Also, the automotive industry is not willing to be outdone, and actively develops and launches new energy vehicles, such as electric vehicles (EV) and hybrid electric vehicles (HEV), to alleviate the environmental problems caused by existing conventional vehicles that use petroleum as a raw material for combustion.

New energy vehicles, such as electric vehicles and hybrid electric vehicles need to be equipped with high-voltage cable harness due to electric drive, and they need to carry a large scaled power storage equipment and a matching arrangement of wire harnesses. The optimization of the wire harness arrangement may greatly save space, reduce costs, and improve installation convenience, so it has received unprecedented attentions.

At present, in wire harness arrangements, the conventional methods are as follows: a plurality of brackets are installed together at the bottom of the vehicle to protect wire harnesses, and all the brackets are connected one by one through a clip-into-slot structure. Materials of which the brackets are made are often rigid materials, such as plastic, which is inflexible. In addition, these brackets are connected to each other through clips and slots. This connection way provides a seamless connection, that is, the brackets after connection are fixed to each other and cannot be bent. Therefore, when a wiring structure with the clip-into-slot structure is installed inside the vehicle, there brings many inconvenience for installation, difficulty of eliminating an installation tolerance, low accuracy for installation, and potential waste of space. For example, to be installed in a narrow space with a bending angle, sometimes another bracket having a shape matching the space has to be used.

In addition, a plurality of brackets connected together by the clip-into-slot structure will form a long strip of brackets in series, and the long strip of brackets in series cannot be folded or bent due to the clip-into-slot structure, resulting in transportation difficulties.

SUMMARY OF THE INVENTION

In view of the problems existing in the wire harness arrangement in a vehicle, a wiring structure for multiple wiring slots connection of the present disclosure provides flexibility at specific locations, and may have the advantages of convenient installation for wire harnesses, elimination of installation tolerance, wide applications, and convenient transportation.

According to an implementation of the present application, a wiring structure for multiple wiring slots connection is provided to be installed at the bottom of a vehicle to protect a wire harness, wherein the wiring structure comprises: a plurality of brackets (1, 3), each having two end parts, and a gap (6) being provided between the end parts of two brackets disposed adjacent to each other; at least one wire harness (2) disposed inside the bracket and extending through the plurality of brackets; and a sleeve (4) being flexible, provided on the outer periphery of the wire harness, and overlapped with the gap in an axial direction.

Preferably, the sleeve (4) has flexibility.

Further preferably, the sleeve (4) is an impact-resistant sheath.

Preferably, the end part of the bracket has a trapezoidal section along a center line of the bracket (1, 3), and becomes wider as closer to an extremity of the end part.

Preferably, a flange (5) is formed at the end part of the bracket (1, 3). The flange (5) of the end part of the bracket (1, 3) is a continuous ring in a section perpendicular to the axial direction of the bracket. Alternatively, the flange (5) of the end part of the bracket (1, 3) is a discontinuous ring in a section perpendicular to the axial direction of the bracket.

In addition, preferably, at least one tie hole (7) is provided on the outer periphery of the bracket (1, 3) to guide a tie therethrough for binding the protected wire harness.

According to an implementation of the present application, the brackets (1, 3) are made of plastic.

Preferably, the trapezoidal section of the end part of the bracket (1, 3) has a width of 5-50 mm in a lower line.

According to another implementation, the bracket (1, 3) is further provided with a cover for protecting and fixing the protected wire harness.

Furthermore, preferably, the gap (6) has a width of 5-10 mm in a direction parallel to the axial direction of the bracket.

Compared with the prior art, the wiring structure for multiple wiring slots connection of the present application, formed as above, has the following advantages of:

1) Ease for installation of wire harnesses: the structure of the present invention has enough space inside the brackets to install wire harnesses when a cover of a wiring slot box is opened;

2) Elimination of installation tolerance: there is no direct connection or fixation between two oppositely disposed brackets, and a flexible impact-resistant sheath is employed at a gap between the brackets, so it can not only effectively protect the wire harness exposed to the gap between the brackets, but also allow movements to adjust installation locations and angles, improving installation accuracy;

3) Wide applications: the present invention can be applied to installation of protected wire harness at the bottoms of different types of vehicles.

4) Convenient transportation: the structure of the present invention is simple and can be separately installed in series and by bending, which is convenient for transportation.

DESCRIPTION OF REFERENCE NUMERALS

1. First bracket,
2. Wire harness,
3. Second bracket,
4. Sleeve,
5. Flange,
6. Gap,
7. Tie hole.

DETAILED DESCRIPTION

The present invention will be further described below with reference to specific embodiments and drawings. In the following description, more details are set forth in order to fully understand the present invention, but the present invention can obviously be implemented in other different ways from that in the description. Those skilled in the art may make similar promotions and deductions according to actual applications without departing from the spirit of the present invention. Therefore, the content of specific embodiments herein should not be interpreted to limit the protection scope of the present invention.

Next, the present invention will be described in detail with reference to the drawings and specific embodiments. In the description, in order to highlight the characteristics of the wiring structure of the present application, some parts known to those skilled in the art are omitted or simplified sometimes.

Figure 1:
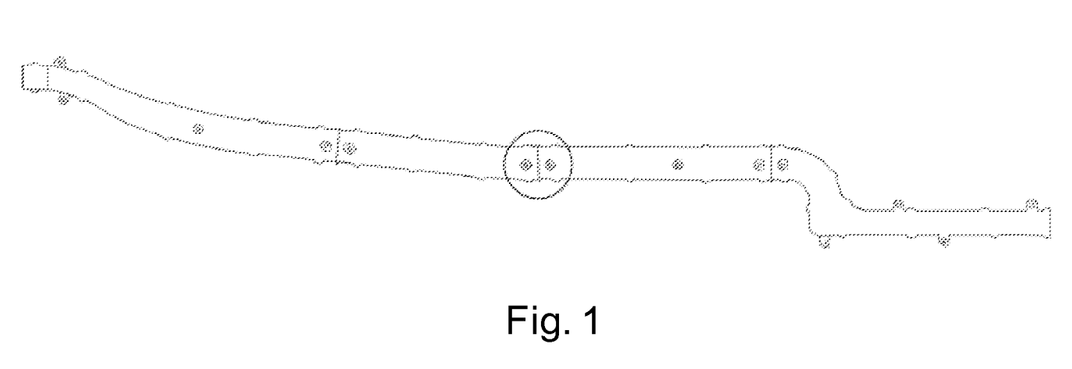
FIG. 1 is a schematic external view of a wiring structure for multiple wiring slots connection in the prior art.
Figure 2:
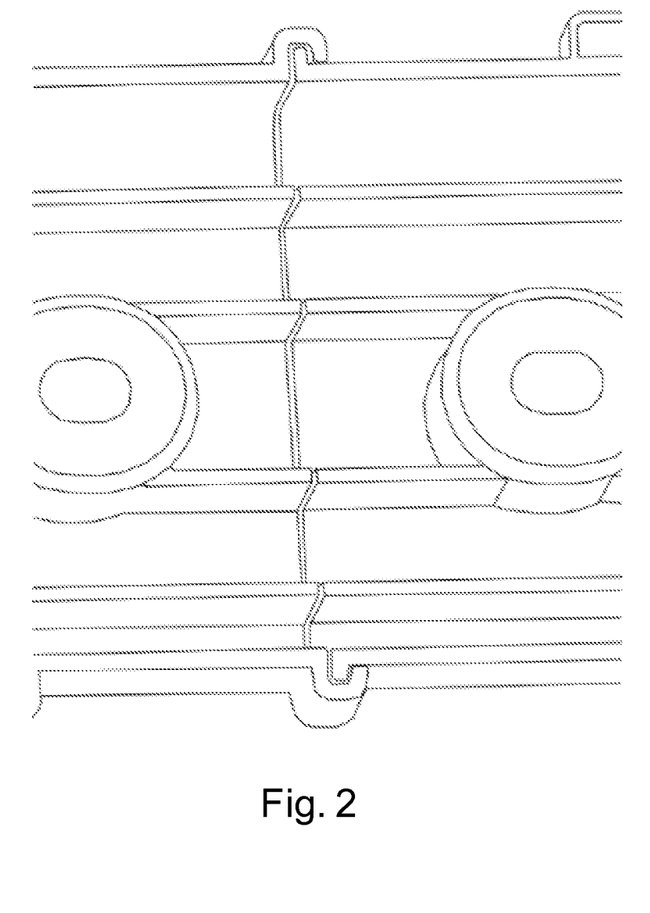
FIG. 2 is a partially enlarged view highlighting a wiring structure for multiple wiring slots connection in the prior art.

At first, a brief description of the prior art will be made with reference to FIGS. 1 and 2 in order to better understand technical solutions involved in the present application and technical effects brought by the technical solutions. FIG. 1 is a schematic external view of a wiring structure for multiple wiring slots connection in the prior art. FIG. 2 is a partially enlarged view highlighting a wiring structure for multiple wiring slots connection in the prior art.

In FIG. 1, it may be observed that a plurality of brackets are connected together one by one to form a long strip-shaped wiring structure, each bracket receives wire harnesses, and each wire harness spans the plurality of brackets to form a long strip-shape. The plurality of brackets in a long strip-shape have no gap with each other, and their connection is tight.

FIG. 2 is a partially enlarged view highlighting a connection part across two brackets shown in FIG. 1, and FIG. 2 is an enlarged view of a part the circle shown in FIG. 1. It may be observed that the connection between the two brackets is implemented by a clip-into-slot structure. In FIG. 2, two clip-into-slot structures are respectively shown in the upper and lower of the figure, in which one bracket has ear-shaped slots, the other bracket has flanges, and the flanges may be clipped into the slots. This clip-into-slot structure is a rigid structure, and thus the connected multiple brackets are not easy to be bent and folded, providing low tolerance in installation, negative effect on space utilization, and various inconvenience in transportation. For example, when installing this wiring structure for multiple wiring slots connection at a corner of the vehicle with a substantially 90-degree angle, it may be necessary to introduce a bracket in a different shape to match the angle, which may be an arc-shaped bracket shown in the right side of FIG. 1. In order to improve the space utilization, it is often necessary to introduce brackets of various shapes to perfectly match the respective space shapes in the existing vehicles. This not only puts forward higher requirements for the forming of the brackets, resulting in the increased manufacturing costs, but also makes it often necessary to consider different installation conditions and choose brackets of different shapes and sizes while installing, which brings a lot of inconvenience to installation engineers.

On the basis of knowing the above-mentioned problems in the prior art wiring structure, wiring structures according to the implementations of the present application will be illustrated with reference to subsequent drawings (FIGS. 3 to 8). By comparing with the structure adopted in the prior art, the technical improvements and the technical effects of the present application may be distinguished more clearly.

Figure 3:
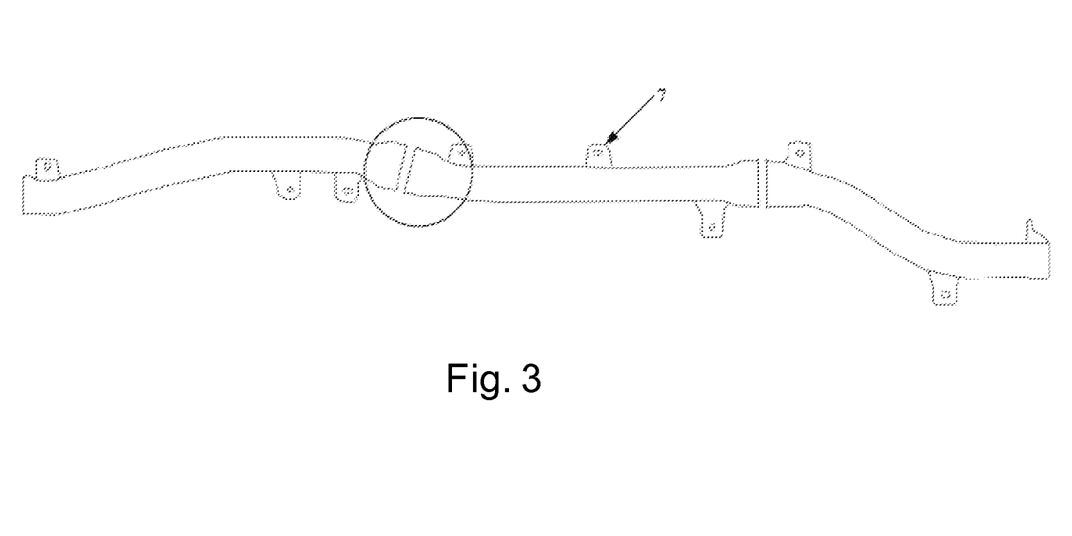
FIG. 3 is a schematic external view of a wiring structure for multiple wiring slots connection according to an implementation of the present application.
Figure 4:
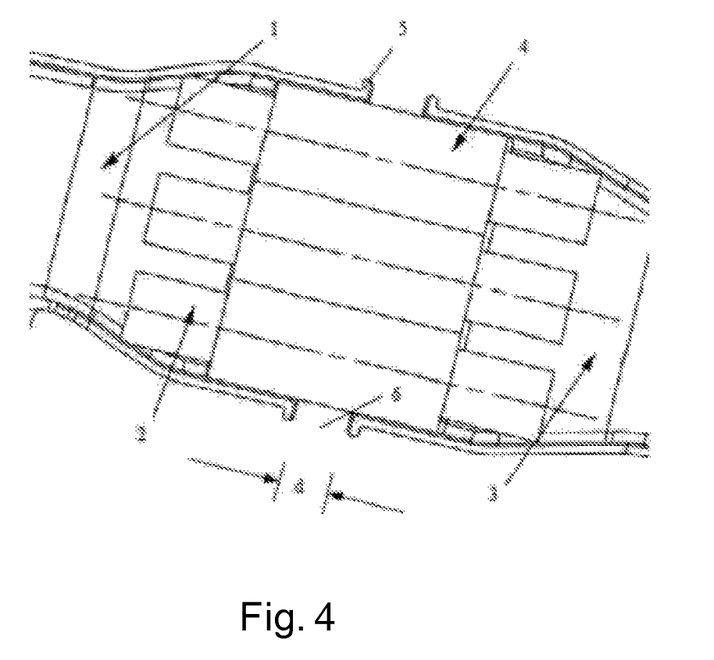
FIG. 4 is a partially enlarged view highlighting a wiring structure for multiple wiring slots connection according to an implementation of the present application.

Next, referring to FIGS. 3 and 4, a wiring structure for multiple wiring slots connection according to an implementation of the present application will be illustrated. FIG. 3 is a schematic external view of a wiring structure for multiple wiring slots connection according to an implementation of the present application. FIG. 4 is an enlarged view highlighting a part of a wiring structure for multiple wiring slots connection according to an implementation of the present application. FIG. 4 is an enlarged view of a part in the circle shown in FIG. 3.

In the external view of FIG. 3, the wiring structure composed of a plurality of brackets (first bracket 1, second bracket 3 . . . ) is substantially in a long strip-shape, and a gap is provided between the brackets to separate them. At least one tie hole 7 is formed on the outer periphery of the long strip-shaped wiring structure to guide a tie therethrough for binding the protected wire harness. In the illustration of FIG. 3, each bracket has two end parts, and a section of the end part in the direction parallel to an axial direction of the bracket is substantially trapezoidal in shape, and this section is a section along a center line of the bracket. A side of the trapezoidal section near an extremity of the bracket is a longer side of the trapezoid, and a side of the trapezoidal section relatively close to a center of the bracket is a shorter side of the trapezoid. That is, the closer to the extremity of the bracket, the wider the end part, and the closer to the center of the bracket, the narrower the end part.

In addition, from FIG. 3, it can be seen that the gap is provided between two brackets disposed adjacently, so the two brackets are not seamlessly connected. Due to disposition of the gap, the plurality of brackets according to the implementation of the present application can still have flexibility after being connected to each other, which facilitates bending and folding, thereby improving the convenience in installations and obtaining more beneficial effects in transportations.

Next, referring to FIG. 4, connection parts of the two brackets to be connected with each other will be illustrated in detail. Though the bracket on the left in FIG. 4 is named a first bracket 1, and the bracket on the right is named a second bracket 2, those skilled in the art will understand that the first bracket and the second bracket are not used to define a front-to-back relationship or order between the brackets, but are merely for ease of description. A gap 6 is provided between the first bracket 1 and the second bracket 3. In other words, the first bracket 1 or the second bracket 3 is not a slotted structure or a rigid structure. The gap 6 in FIG. 4 is shown to have a width d, which is a distance between the separated two brackets, and may also be referred to as "gap width".

In addition, the reference numeral "2" in FIG. 4 indicates a wire harness, and at least one wire harness 2 may be received in the first bracket 1 and the second bracket 3. The specific number of wire harnesses is not limitative, and an appropriate number of wire harnesses may be disposed as needed. Three wire harnesses are shown in FIG. 4. The wire harness 2 extends through the first bracket 1, the gap 6 and the second bracket 3, and a sleeve 4 is provided on the outer periphery of each wire harness 2, that is, each wire harness 2 is sleeved with the sleeve 4. The sleeve 4 is made of flexible material to protect the wire harness 2. The sleeve 4 of flexible material not only brings sufficient flexibility to the wiring structure, but also provides sufficient protection for the wire harness.

According to an implementation of the present application, the sleeve 4 may be an impact-resistant sheath, specifically, may adopt a new material of a high-voltage cable protection product developed by Federal-Mogul Corporation and under the trade name CrushShield™. As a protective shielding material for high-voltage cables of electric vehicles and hybrid electric vehicles (EV/HEV), CrushShield™ may surround the cable to isolate a battery cable from an executive structure of a car, and have a robust, multi-layer fiber material and a unique base design, all acting together to absorb and disperse the impact. For example, it may disperse a shear force generated during collision.

Of course, the material of the sleeve 4 may be other materials that provide sufficient protection for the vehicle wire harness and have sufficient flexibility, not limited to the specific materials mentioned herein. Any material is acceptable as long as the above conditions are satisfied. It may be any flexible materials available in the market.

With continued reference to FIG. 4, a flange 5 is formed at the end part of each bracket and near the gap 6 between the two brackets (1, 3). FIG. 4 is a sectional view cut along the center line of the brackets and at the connection part across the brackets. In this sectional view, the flange 5 appears as a protruding block and is disposed at the extremity of the end part of the bracket. In fact, the flange 5 is formed on the outer periphery of the bracket, and is a structure that protrudes radially apart from the bracket. The flange 5 may be varied in shape and arrangement. For example, if the bracket is circular, the flange 5 may be a continuous ring, continuously formed on the entire periphery of the bracket. The flange 5 may also be a discontinuous ring with a plurality of disconnected flanges 5 formed on the outer periphery of the bracket, that is, the flanges 5 are spaced apart from each other, as isolated islands. By providing the flange 5 at the end part of the bracket, the effect of preventing wear may be achieved. In addition, since the flange 5 is provided, it is more convenient and more accurate to align two brackets with each other during installation.

In addition, referring to FIG. 3 and FIG. 4, the end part of the bracket according to an implementation of the present application is formed in a shape with a wider size near an extremity of the end part, and this structure helps to dispose the sleeve 4. As described above, the sleeve 4 overlaps the gap 6 in the installation position, and the axial length of the sleeve 4 is slightly greater than the axial length "d" of the gap 6. The axial length d of the gap 6 may be in a range of 5-10 mm. Due to the addition of the sleeve 4, a part of the bracket where the sleeve 4 is provided may have a larger size than the rest of the bracket where only the wire harness are disposed, which is beneficial to the wiring of the wire harness and improves reliability. Assuming that the bracket is formed in a uniform size and has the same diameter in the longitudinal direction as a cylinder, it would result in a loose arrangement of wire harnesses in a space where only the wire harness are disposed, which is detrimental to the reliability. However, the present application solves the above-mentioned problem simply by employing a structure with a wider size for the extremity of the end part, in which the part of the bracket where the sleeve 4 is provided is designed to be wider, and the part where the sleeve 4 is not provided is designed to be narrower.

Preferably, in the wiring structure for multiple wiring slots connection according to an implementation of the present application, a trapezoidal section of the end part of the bracket along the center line has a length of 5-50 mm in the lower line.

In addition, in the wiring structure for multiple wiring slots connection according to an implementation of the present application, a cover (not shown in the figures) may be provided on the bracket to wrap the wire harness inside the bracket for protection and fixation.

Figure 5:
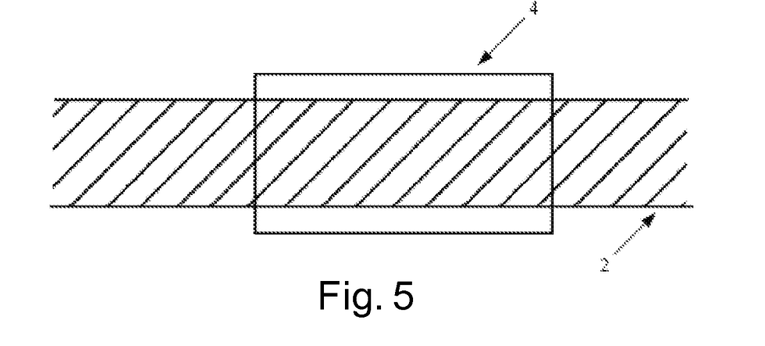
FIG. 5 is an axial sectional view of a wire harness and a sleeve according to an implementation of the present application.

Next, referring to FIG. 5, a relationship between a wire harness and a sleeve according to the implementation of the present application will be described. FIG. 5 is a sectional view of the wire harness and the sleeve in the axial direction. The reference numeral "2" in FIG. 5 indicates the wire harness, which is represented by shade, and "4" indicates the sleeve. In order to avoid obscuring improvement points of this implementation, the sleeve 4 and the wire harness 2 are only schematically shown in the figure. As shown in the figure, the sleeve 4 is disposed on the outer periphery of the wire harness 2 so as to protect the wire harness 2. Of course, the shape of the sleeve 4 may vary with the shape of the wire harness 2. When the wire harness 2 is circular, the sleeve 4 may have a ring shape, and the wire harness 2 and the sleeve 4 together form a concentric circle. When the wire harness 2 is a flat wire, the sleeve 4 may have an oval shape. No limitation is provided on the shapes of the wire harness 2 and the sleeve 4 as long as the sleeve 4 is provided on the outer periphery of the wire harness 2 and can protect the wire harness 2. In addition, since the sleeve 4 is provided on the outer periphery of the wire harness 2, a part of the bracket where the sleeve 4 is provided has an increased size correspondingly. It is noted that the sleeve 4 is positioned to overlap the gap 6 between the end parts of the two brackets. Thus, it provides not only flexibility but also reliability, thereby taking both safety and performance into account.

Figure 6:
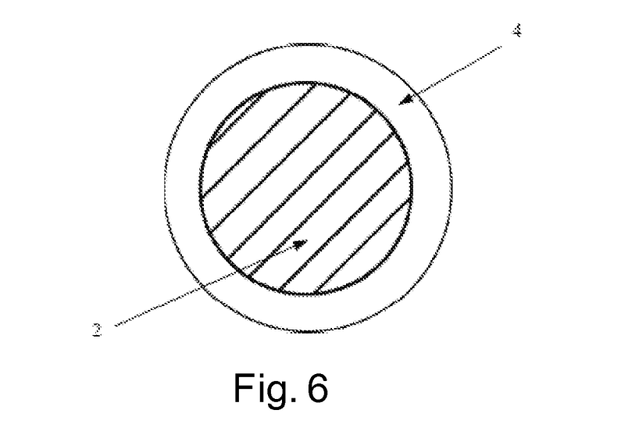
FIG. 6 is a sectional view of a wire harness and a sleeve in a direction perpendicular to an axial direction according to an implementation of the present application.

FIG. 6 is a sectional view of a sleeve and a wire harness in a direction perpendicular to the axial direction. In FIG. 6, the shaded part is the wire harness 2, and the blank part without shadow is the sleeve 4. The illustrated structure is a circular wire harness 2 and an annular sleeve 4 corresponding thereto. The wire harness 2 is located at the center, and the sleeve 4 is located at the outer periphery of the wire harness. At this time, the wire harness and the sleeve form a concentric circle. Of course, this application is not intended to limit the shapes of the wire harness and the sleeve, but only schematically show the relative relationship between the sleeve and the wire harness.

Figure 7:
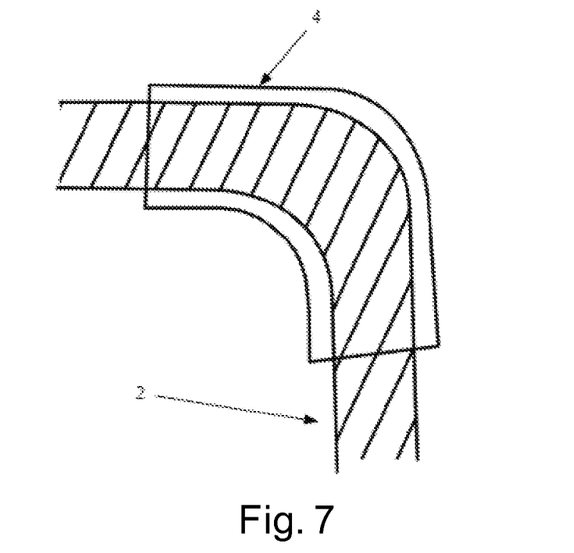
FIG. 7 is a sectional view schematically showing a status of a wire harness after installation according to an implementation of the present application.
Figure 8:
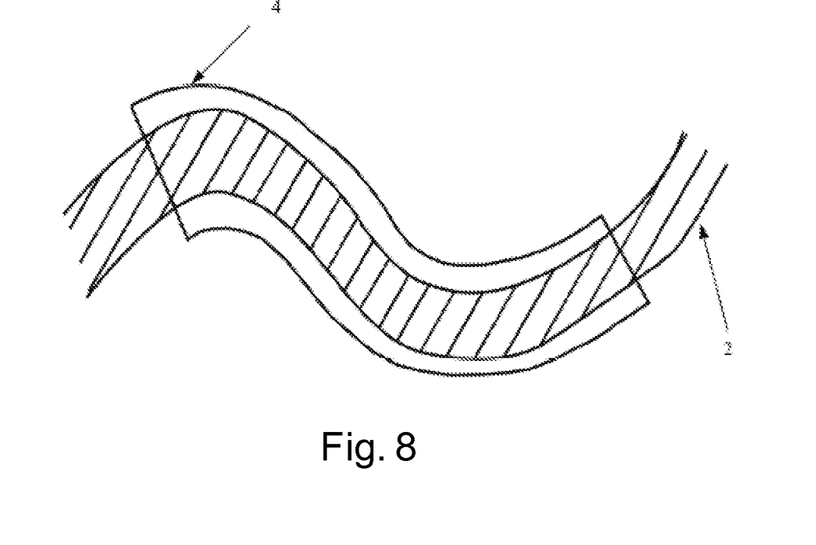
FIG. 8 is a sectional view schematically showing a status of a wire harness after installation according to another implementation of the present application.

Next, referring to FIGS. 7-8, the schematic diagram of the wire harness and the sleeve after installation according to the implementation of the present application will be continuously discussed. The shaded part in the figures is the wire harness 2 and the unshaded part is the sleeve 4. FIG. 7 is a schematic diagram of a wiring structure disposed in a curved space. For example, when the angle formed by the curved space is about 90 degrees, and the wiring structure needs to be installed in such a curved space, instead of using a special bracket suitable for the curved space, the wiring structure may be bent by the flexibility of the sleeve 4. A special bracket suitable for the curved space will cause an increase in cost, which is an undesirable way. The wiring structure for multiple wiring slots connection of the present application reduces the types of molds required to manufacture brackets of different shapes by using gaps and sleeves in corresponding locations of the wiring structure. By simplifying the manufacturing method, the manufacturing cost may be reduced, and the ease of installation may also be improved.

FIG. 8 is a schematic diagram of the wire harness and the sleeve after installation according to another implementation. The shaded part in the figure is the wire harness 2 and the unshaded part is the sleeve 4. FIG. 8 is a schematic diagram of a structure for installing the wiring structure in a zigzag space. Similar to the implementation of FIG. 7, instead of using a special bracket suitable for the zigzag curved space, the wiring structure may be bent along the space to be installed in by the flexibility of the sleeve 4. A special bracket suitable for the zigzag space will cause an increase in cost, which is an undesirable way. The wiring structure for multiple wiring slots connection of the present application reduces the types of molds required to manufacture brackets of different shapes by using gaps and sleeves in corresponding locations of the wiring structure. By simplifying the manufacturing method, the manufacturing cost may be reduced, and the ease of installation may also be improved.

The above two implementations shown in FIG. 7 and FIG. 8 are only schematic structures adopted for illustrating the wiring structure for multiple wiring slots connection of the present invention. Those skilled in the art could bend the brackets in various ways as needed, and especially match the wiring structure with various shapes of space based on the benefit from the flexible structure characteristics formed by the gap at the connection of the brackets. It can save the space occupied by the wiring structure, improve the convenience for installation of the wiring structure, save costs, and may be commonly used in electric vehicles, hybrid electric vehicles, and other new energy vehicles.

In addition, those skilled in the art will understand that although FIGS. 7 and 8 only show one wire harness and one sleeve, it is only illustrative, and similar installations may be achieved in the presence of multiple wire harnesses. The number of wire harness and sleeves is not limitative.

In short, the principle of the present invention is as follows:

There is a certain gap between the first bracket 1 and the second bracket 3, that is, the connection between two brackets is not a seamless connection. The harness at the gap is protected by an impact-resistant sheath, that is, a flexible sleeve, such as CrushShield™. When installed onto the vehicle, an entire chain of brackets may move back and forth with the flexible characteristic of the sleeve, so that the installation tolerance between the entire vehicle body and the brackets may be more easily eliminated, making the bracket installation more convenient. In addition, due to the flexible sleeves, the entire chain of brackets may be bent to be convenient for transportation too.

Although the present disclosure is disclosed as above with preferred embodiments, it is not intended to limit the present invention, and any person skilled in the art may make possible changes and modifications without departing from the spirit and scope of the present invention. Therefore, any modifications, equivalent changes, and adjustments to the above embodiments based on the technical essence of the present invention without departing from the spirit of technical solutions of the present invention fall within the protection scope defined by the claims of the present invention.

The invention claimed is:

1. A wiring structure for multiple wiring slots connection to be installed at a bottom of a vehicle to protect a wire harness, the wiring structure comprising:
   a plurality of brackets, each having two end parts, and a gap being provided between respective end parts of two adjacent brackets disposed adjacent to each other, wherein a flange is formed at a particular end part of a particular bracket;
   at least one wire harness disposed inside the plurality of brackets and extending through the plurality of brackets; and
   a flexible sleeve provided on the outer periphery of the at least one wire harness and overlapped with the gap in an axial direction.

2. The wiring structure for multiple wiring slots connection of claim 1, wherein the flexible sleeve is an impact-resistant sheath.

3. The wiring structure for multiple wiring slots connection of claim 1, wherein the particular end part of the particular bracket has a trapezoidal section along a center line of the particular bracket that becomes wider as closer to an extremity of the particular end part.

4. The wiring structure for multiple wiring slots connection of claim 1, wherein the flange is a continuous ring in a section perpendicular to the axial direction.

5. The wiring structure for multiple wiring slots connection of claim 1, wherein the flange is a discontinuous ring in a section perpendicular to the axial direction.

6. The wiring structure for multiple wiring slots connection of claim 1, wherein at least one tie hole is provided on the outer periphery of the particular bracket to guide a tie therethrough for binding the at least one wire harness.

7. The wiring structure for multiple wiring slots connection of claim 1, wherein the plurality of brackets are made of plastic.

8. The wiring structure for multiple wiring slots connection of claim 3, wherein the trapezoidal section has a width of 5-50 mm in a lower line.

9. The wiring structure for multiple wiring slots connection of claim 1, wherein the particular bracket is further provided with a cover for protecting and fixing the at least one wire harness.

10. The wiring structure for multiple wiring slots connection of claim 1, wherein the gap has a width of 5-10 mm in a direction parallel to the axial direction.

11. A wiring structure for multiple wiring slots connection to be installed at a bottom of a vehicle to protect a wire harness, the wiring structure comprising:
   a plurality of brackets, each having two end parts, and a gap being provided between respective end parts of two adjacent brackets disposed adjacent to each other, wherein a particular end part of the particular bracket has a trapezoidal section along a center line of the particular bracket that becomes wider as closer to an extremity of the particular end part;
at least one wire harness disposed inside the plurality of brackets and extending through the plurality of brackets; and
a flexible sleeve provided on the outer periphery of the at least one wire harness and overlapped with the gap in an axial direction.

12. The wiring structure for multiple wiring slots connection of claim 11, wherein the trapezoidal section has a width of 5-50 mm in a lower line.

13. The wiring structure for multiple wiring slot connection of claim 11, wherein a flange is formed at the particular end part of the particular bracket.

14. A method for providing wiring structure for multiple wiring slots connection to be installed at a bottom of a vehicle to protect a wire harness, the method comprising:
providing a plurality of brackets, each having two end parts, and a gap being provided between the respective end parts of two adjacent brackets disposed adjacent to each other, wherein at least one of (i) a flange is formed at a particular end part of a particular bracket and (ii) the particular end part of the particular bracket has a trapezoidal section along a center line of the particular bracket that becomes wider as closer to an extremity of the particular end part;
providing at least one wire harness disposed inside the plurality of brackets and extending through the plurality of brackets; and
providing a flexible sleeve on the outer periphery of the at least one wire harness and overlapped with the gap in an axial direction.

15. The method of claim 14, wherein the flange is formed at the particular end part of the particular bracket and the flange is a continuous ring in a section perpendicular to the axial direction.

16. The method of claim 14, wherein the flange is formed at the particular end part of the particular bracket and the flange is a discontinuous ring in a section perpendicular to the axial direction.

17. The method of claim 14, wherein the particular end part of the particular bracket has the trapezoidal section and the trapezoidal section has a width of 5-50 mm in a lower line.

18. The method of claim 14, further comprising providing at least one tie hole on the outer periphery of the particular bracket to guide a tie therethrough for binding the at least one wire harness.

19. The method of claim 14, wherein the flexible sleeve is an impact-resistant sheath.

20. The method of claim 14, wherein the gap has a width of 5-10 mm in a direction parallel to the axial direction.

* * * * *